July 13, 1965   F. H. BATTLE, JR., ETAL   3,195,132
AUTOCALIBRATION OF DECODING RECEIVERS
Filed Jan. 16, 1962   3 Sheets-Sheet 1
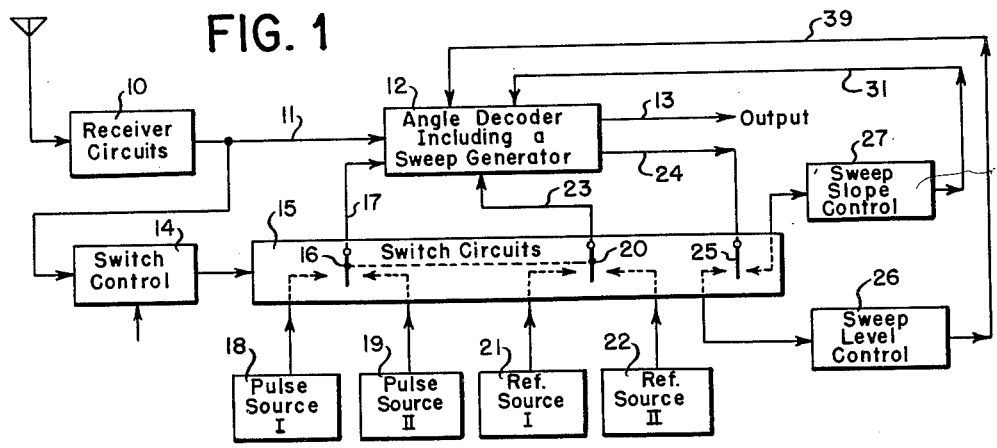
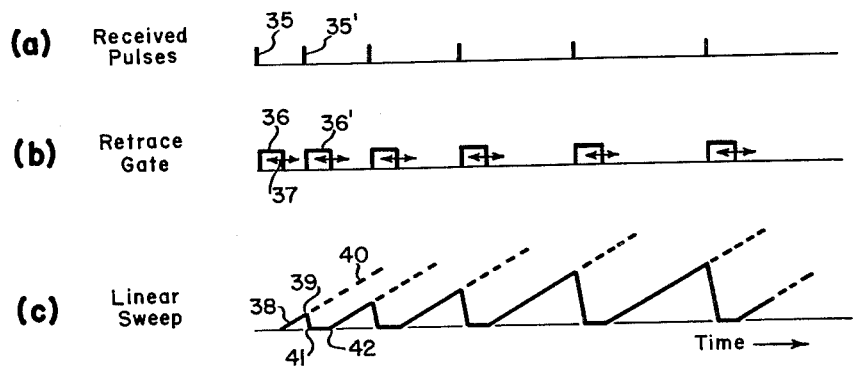
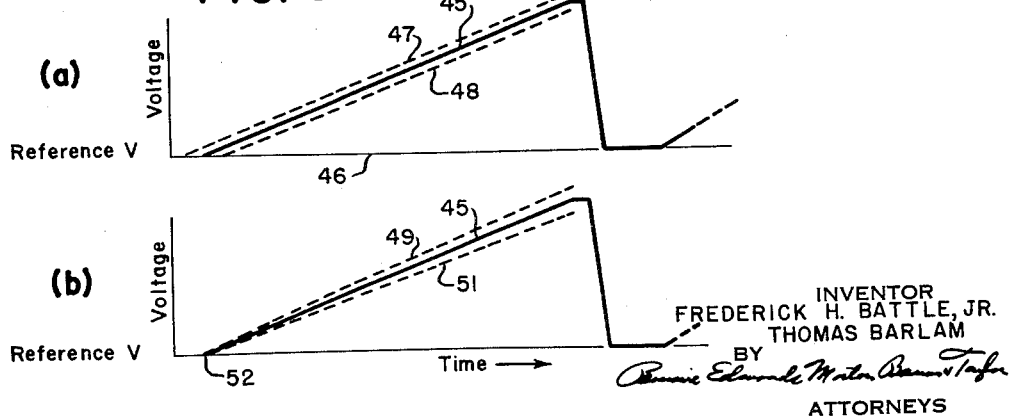
INVENTOR
FREDERICK H. BATTLE, JR.
THOMAS BARLAM
ATTORNEYS

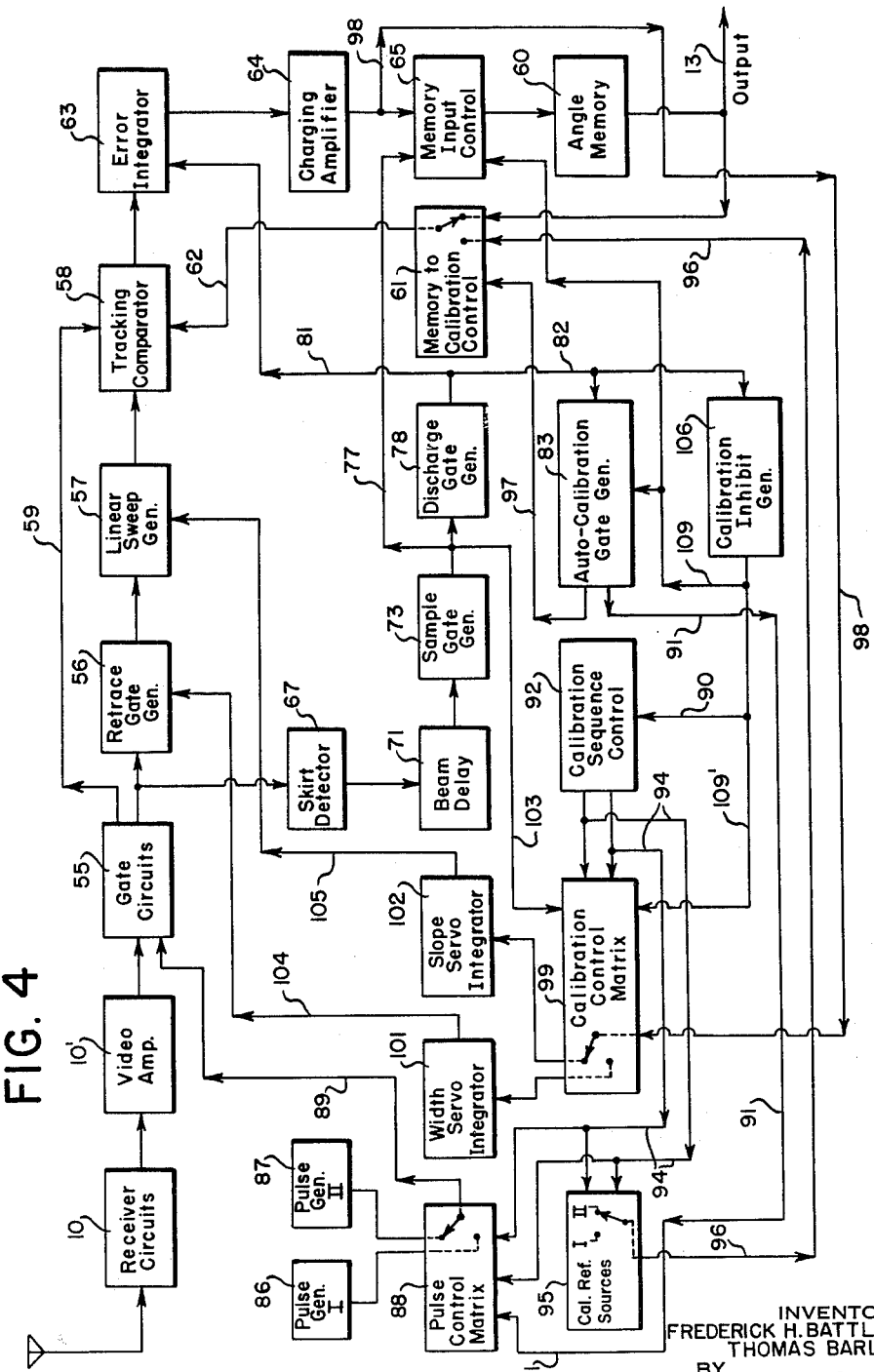

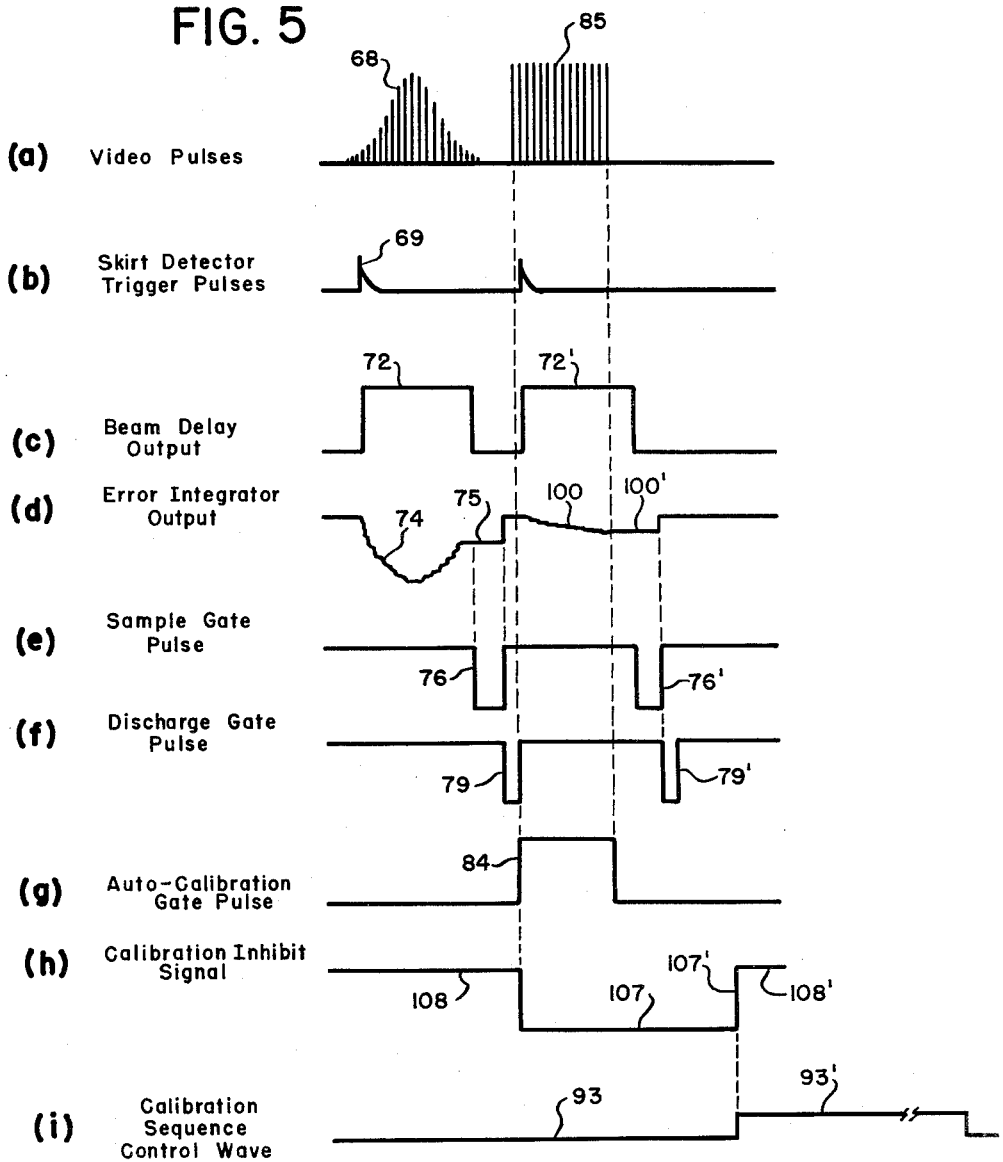

United States Patent Office 3,195,132
Patented July 13, 1965

3,195,132
AUTOCALIBRATION OF DECODING RECEIVERS
Frederick H. Battle, Jr., Seaford, and Thomas Barlam, Syosset, N.Y., assignors to Cutler-Hammer, Inc., Milwaukee, Wis., a corporation of Delaware
Filed Jan. 16, 1962, Ser. No. 166,624
8 Claims. (Cl. 343—106)

This invention relates to the automatic calibration of a receiver for decoding a scanning beam which is angle-coded by pulse modulations transmitted at intervals varying with the beam direction angle.

In application Serial No. 825,469, filed July 7, 1959 and now abandoned by Battle and Tatz for "Aircraft Landing System" now continuation-in-part Serial No. 123,928, filed June 28, 1961, now U.S. Patent No. 3,157,877, an aircraft navigation and landing system is described employing one or more scanning beams pulse-coded as a function of the direction angle thereof. The pulse coding system specifically described therein includes a regularly recurring series of reference pulse modulations with sliding pulse modulations therebetween whose time occurrence with respect to the reference pulse modulations varies as a function of the beam direction angle.

In application Serial No. 27,406, filed May 6, 1960 by Battle and Tatz for "Aircraft Landing System," a different pulse coding arrangement is described in which the time spacing of successive angle-coding pulse modulations progressively varies as a predetermined function of the beam direction angle from a predetermined reference angle.

Airborne receivers for decoding pulse spacings are described in the above-mentioned applications which include a sweep generator in the decoder. In particular, the instantaneous sweep amplitudes corresponding to the reception of the angle coding pulses are picked off and utilized to produce a signal representing the corresponding beam direction angle.

In such a decoder it is important that the sweep be precisely maintained in order to obtain high accuracy of decoding. Despite care in design, however, it is always possible for some changes to occur due to variations in power supply, aging, environmental conditions, etc.

In application Serial No. 27,406 an automatic calibration circuit is described which functions between successive beam passages over an aircraft and serves to automatically calibrate the sweep at one or more points therealong. This is accomplished by supplying a train of reference pulses of precise spacing to the angle decoding circuits along with a calibration signal representing the output that should be obtained, detecting any error in decoding, and using the error signal to effect a suitable correction. A plurality of different reference pulse spacings representing different beam direction angles, and a corresponding plurality of calibration signals, may be employed in order to calibrate the sweep at different points therealong. An arrangement is described for automatically selecting for a given calibration the one of the plurality of reference pulse spacings which is nearest the then-existing angle of the aircraft from the beam site.

Although the calibration circuit previously described is capable of good results, it is possible in practice for a recalibration at one point of the sweep to adversely affect the calibration at another point therealong. Thus, if the sweep slope should change, a calibration at one point therealong might result in an error in detecting an angle signal corresponding to another point. Calibration near the point next to be used assists in this respect, but involves considerable circuitry.

The present invention provides a calibration circuit in which both the sweep level and the sweep slope are corrected so that, with a linear sweep, accurate decoding at any portion of the sweep may be obtained.

In accordance with the invention, two series of test pulses of different spacings (different pulse recurrence frequency or PRF) are employed along with a corresponding pair of calibration signals. Error signals are developed corresponding to the two calibration points and used to adjust sweep level and sweep slope. As specifically described hereinafter, one error signal is used to adjust the sweep level and the other the sweep slope. In this manner a calibration may be obtained which is effective over the entire sweep range, while at the same time requiring the use of only two calibration points. If desired, of course, additional calibration points could be checked and corresponding corrections made, although in general this is not believed necessary.

The invention will be described in connection with a specific embodiment thereof.

In the drawings:

FIG. 1 is a block diagram showing a general arrangement of the invention;

FIG. 2 shows waveforms illustrating the use of sweeps in decoding angle-coding pulses;

FIGS. 3 (a) and (b) are waveforms illustrating sweep level and sweep slope control in accordance with the invention;

FIG. 4 is a detailed block diagram in accordance with the invention; and

FIG. 5 shows waveforms applicable to the block diagram of FIG. 4.

Referring to FIG. 1, receiver circuits are indicated at 10 for receiving the transmitted beam direction angle coding pulses and delivering corresponding video pulses to output line 11. Block 12 is the angle decoder for decoding the received pulse spacings and producing corresponding angle signals. The decoder includes a sweep generator which participates in the decoding operation. An output representing the decoded angle is delivered to line 13.

In between beam passages a switch control circuit 14 actuates switch circuits in block 15. These are normally electronic matrices employing gates, electronic switches, etc., but are here shown symbolically as mechanical switches for convenience of understanding.

Switch 16 is controlled to alternately apply test pulse series I and II from pulse sources 18 and 19 through line 17 to the angle decoder 12. At the same time switch 20 is actuated to deliver the corresponding calibration signal I or II from one of the sources 21, 22 to line 23. The calibration signal in line 23 is the signal which should result from the decoding of the particular test pulse series in line 17. If the resultant decoded signal in decoder 12 is not correct, an error signal is delivered to line 24.

Switch 25 is actuated to deliver this error signal to either the sweep level control circuit 26 or the sweep slope control circuit 27, depending upon whether calibration I or calibration II is effective. Circuit 26 delivers a correction signal through line 39 which adjusts the level of the sweep in 12 until the decoded signal corresponding to test pulse series I is exactly equal to the corresponding calibration signal I. Similarly, a sweep slope control signal is applied through line 31 to the decoder so as to change the slope of the sweep therein until the output for test pulse series II is exactly equal to the corresponding calibration signal II.

Control circuits 26 and 27 are arranged to store the control signals so that the level and slope of the sweep, once properly calibrated, will remain so. Advantageously, the level and slope control circuits are arranged to integrate successive error signals over a number of calibration cycles so that stable operation results.

Although in some applications both calibrations could be effected between successive beam receptions, in the specific embodiment herein described they are effected alternately in alternate intervals between beam passages.

FIG. 2 illustrates one way of using a sweep generator in the decoding of the angle pulse intervals, as described in detail in application Ser. No. 27,406. In FIG. 2(a) a series of video angle pulses is shown at 35, 35', etc. In accordance with the particular coding system illustrated, the time separation from each pulse to the next represents the then-existing beam angle with respect to a reference angle (such as horizontal or a small angle below horizontal). A fixed minimum spacing corresponds to the reference angle and the variation from the minimum spacing is linear with angle.

FIG. 2(b) illustrates a series of retrace gates used to control the retrace of the linear sweeps. As shown, each retrace gate 36, 36', etc. starts with the arrival of a corresponding pulse 35, 35'. The length of the retrace gate is nominally equal to the fixed minimum spacing, but is adjustable as shown by arrows 37.

FIG. 2(c) shows sweeps correspondingly to the pulse intervals shown in (a). Each sweep is initiated by the trailing edge of the corresponding retrace gate. Thus, sweep 38 starts at the trailing edge of retrace gate 36, and rises linearly at a predetermined rate, depending upon the scale factor selected. If allowed, the sweep would continue to rise as shown by dotted line 40. However, upon arrival of the succeeding pulse 35', the leading edge of the corresponding retrace gate 36' stops sweep 38 as shown at 39. The sweep then retraces to point 41 and is held there until the trailing edge of gate 36' starts the next sweep at point 42. A slight dwell before retrace begins may be introduced, as shown in FIG. 3, to facilitate operation of subsequent circuits.

As the intervals between successive received pulses increase, the linear sweep will rise to higher and higher values before it is cut off. Consequently, the amplitude of the sweeps in FIG. 2(c) is proportional to the separation of the pulses in FIG. 2(a), and hence proportional to the instantaneous beam direction angle. These amplitudes are then used to develop a stored signal representing the then-existing beam angle.

For purposes of illustration, the separation of the received pulses at (a) changes markedly. However, it will be understood that during a single passage of the beam over an aircraft, only slight changes in the pulse spacing will result since the angle of the aircraft with respect to the beam site will not change very much during the beam passage, and the change in pulse spacing will be primarily due to width of the beam (which is small).

Accuracy of decoding is greatly faciliated by employing a linear sweep. It has been found in practice that adequate linearity can be obtained, and that it is not likely to be affected by aging, environment, etc. However, for accuracy of decoding, it is necessary that the potential of the sweep with respect to a reference potential exactly correspond at every point therealong to the corresponding angles. If the overall sweep level with respect to a reference level changes, or the sweep slope changes, errors in decoding will result. This is illustrated in FIGS. 3(a) and 3(b).

Referring to FIG. 3(a), the full line 45 shows the desired variation of sweep voltage with time, with respect to a reference voltage shown by line 46. This may be ground or any other desired reference potential. If, for any reason, the sweep level rises or falls, as shown by lines 47, 48, an angle coding error will result. This can be corrected by changing the overall sweep level with respect to the reference level. One way of doing this is to change the point at which the sweep is initiated, and this is specifically described hereinafter. Or, the reference level could be changed until the difference between the reference level and the sweep potential at any point therealong is corrected.

Referring to FIG. 3(b), full line 45 again represents the desired sweep. Dash lines 49 and 51 represent changes in sweep slope. Accordingly, except at the initial point 52, decoding errors will result.

In practice, combinations of the conditions shown in FIG. 3(a) and FIG. 3(b) may occur.

In accordance with the present invention, the accuracy of decoding is determined by applying two pulse series of different pulse recurrence frequency (PRF) to the angle decoder and comparing the resultant decoded signals with calibrated reference voltages. If errors exist, the error signals are used to adjust the sweep level and sweep slope until adequate correction is obtained.

In general, the two PRF's may be selected to correspond to any angles desired. However, in one particular system with which this invention has been found useful, small angle accuracy is particularly important, and accordingly one PRF was selected to correspond to 0°. As actually employed, the sweeps start at a slightly negative value, and ground potential corresponds to 0°. The pulse spacing in this particular embodiment for 0° is 18 microseconds. The maximum angle is 20°, corresponding to a 98-microsecond spacing. A 63-microsecond spacing was selected for the other pulse series. Any error found in the 0° test is used to correct the sweep level and any error found at the higher angle test is used to change the slope.

FIG. 4 shows a block diagram of a receiver incorporating the calibration system of the present invention. This is similar in many respects to that described in the aforesaid application Serial No. 27,406, but considerable simplification has been introduced in the decoding circuits where the details are believed unnecessary for an understanding of the present invention. Also, only a single beam decoder is shown in FIG. 4 rather than the three-beam decoder of the prior application, to avoid unnecessary complexity. The explanation will be considerably abbreviated herein, since reference may be had to the aforesaid application for further detail if desired.

Referring to FIG. 4, receiver circuits are shown at 10, and may be of the superheterodyne type with AGC control. A video amplifier is shown at 10' and supplies video pulses through gate circuits 55 to a retrace generator 56. The gate circuits may include a tracking gate, search gate, etc. as desired for the particular application. A linear sweep generator is shown at 57, and the termination and retrace of the sweep is controlled by retrace generator 56 as described in connection with FIG. 2.

The terminal sweep potentials, representing the angles between corresponding pairs of pulses, are supplied to a tracking comparator 58 along with video pulses through line 59. Any previously stored angle signal in angle memory 60 is supplied through the memory-to-calibration control circuit 61 and line 62 to the tracking comparator, and an error signal output is produced representing the instantaneous error of each angle signal with respect to the previously stored signal. The tracking comparator is described in detail in the aforementioned application. The error signal is integrated in 63, and then supplied through a constant current charging amplifier 64 and a memory input control circuit 65 to the memory circuit 60, so as to correct the value of the stored signal.

Inasmuch as the angle decoder must be effective to decode received signals during beam passages, but is to be suplied with test pulse series between beam passages, provision is made to effect proper switching.

As here shown, the skirt detector 67 is supplied with the video output of the gate circuits. It is designed to give a trigger pulse at the beginning of a beam passage, as shown in FIG. 5. In FIG. 5(a) the received beam pulses are shown at 68, and in FIG. 5(b) a trigger pulse 69 is shown occurring near the beginning of the beam where the pulses are of low level. Conveniently the skirt detector may include a short time constant integrating circuit and a Schmidt trigger circuit actuated by a level corresponding to the integration of a few pulses. The leading edge of the Schmidt circuit output may be differentiated to produce pulse 69.

The sensitivity of the skirt detector may be made greater than that of the retrace generator 56 so that no useful pulses are missed, although the missing of a few low level pulses at the beginning of a beam passage will often not be serious.

The output pulses of the skirt detector are supplied to a beam delay unit 71 to develop delay pulses 72, 72' as shown in FIG. 5(c). This delay is used in the embodiment shown since the output of the error integrator 63 is not correct until all pulses in a beam passage have been received and decoded. Circuit 71 may conveniently be a multivibrator designed to give a pulse at least as long as the duration of a beam passage. Its output is supplied to a sample gate generator 73 which develops a gate pulse of fixed duration immediately following the termination of the beam delay, as shown in FIG. 5(e).

The output of the error integrator 63 is illustrated in (FIG. 5d). During the course of a beam passage instantaneous error signals are developed for each pair of pulses, as indicated at 74, and give a final integrated error signal at the end of the beam passage as shown at 75. The sample gate pulse 76 is supplied through line 77 to the memory input control unit 65 so as to deliver the error signal to the angle memory circuit 60 only during the occurrence of the sample gate.

The output of the sample gate generator 73 is also supplied to a discharge gate generator 78 to generate a pulse as shown at 79 in FIG. 5(f). This pulse is supplied through line 81 to the error integrator 63 to discharge the integrator, ready for a new integration.

This concludes the correction of the angle memory signal for a given beam passage, and calibration can now take place.

Accordingly, the output of the discharge gate generator 78 is supplied through line 82 to an auto-calibration gate generator 83. This generates a gate pulse 84, as shown in FIG. 5(g). One of the functions of the gate 84 is to supply a burst of test pulses to the decoder, as shown at 85 in FIG. 5(a). The spacing of pulses 85 may have one or the other of the test values, as discussed above.

The test pulses are generated in the pulse generators 86 and 87. These may be crystal controlled oscillators with pulse shaping circuits to deliver output pulses of the proper length and periodicity. In one particular embodiment, generator 86 gave pulses with a PRF of 55.555 kilocycles, thereby yielding 18 microsecond pulse spacings corresponding to a 0° angle. Generator 87 gave pulses with a PRF of 15.873 kilocycles, corresponding to 63-microsecond pulse spacings. One or the other of these pulse bursts is supplied through a pulse control matrix 88 and line 89 to the gate circuits 55 and thence to the decoding circuits.

If the gate circuits are so designed that they would not pass the reference pulse bursts, the latter could be supplied directly to the retrace gate generator 56, with appropriate changes elsewhere in the circuits as required.

Matrix 88 is controlled so as to supply the reference pulses only during the calibration intervals, and to deliver test pulse series I and II alternately to line 89. To this end, the output of the auto-calibration gate generator 83 is supplied through line 91 to matrix 88, and gates the latter open only during the auto-calibration gate pulse intervals 84 (FIG. 5). The sequence is determined by a calibration sequence control circuit 92 which generates a control wave as illustrated at 93 in FIG. 5(i). This control circuit may be a bistable multi-vibrator actuated alternately to one or the other of its states in response to an applied signal in line 90. The two states are delivered through lines 94 to the matrix 88 to control the latter.

The timing of sequence control circuit 92 will be described later.

Calibration signals I and II in the form of angle reference voltages are developed in 95, advantageously from a precision D.-C. source. One or the other of these reference voltages is delivered to line 96 under the control of the calibration sequence waves in lines 94. Thus, when pulse series I is being supplied to the detector, the corresponding calibration signal I is supplied to line 96, and similarly for pulse series II and calibration signal II.

The calibration signal in line 96 is supplied to the memory-to-calibration control circuit 61. The latter is supplied with the output of autocalibration gate generator 83 through line 97 so that it supplies the calibration signal from line 96 to the tracking comparator 58 during the calibration intervals. Accordingly, the tracking comparator 58 compares the terminal sweep potentials resulting from the pulses in the test series with the calibration signals representing the angle memory voltage which should be obtained from the pulse spacings of the test series. If an error exists, it is supplied to the error integrator 63. The output of the latter is delivered through the charging amplifier 64 and line 98 to the calibration control matrix 99.

A calibration error is illustrated in FIG. 5(d) where jagged line 100 indicates the buildup of successive pulse pair errors to a final value at 100'. The difference in shape between 100 and 74 is due to the fact that the test pulses 85 are of uniform amplitude and spacing, whereas the beam pulses 68 vary in both respects.

Calibration control matrix 99 delivers the error signal to either the width servo-integrator 101 or the slope servo-integrator 102, depending upon whether pulse series I or II is being employed. Accordingly, matrix 99 is switched from one position to the other by the output of the calibration sequence control unit 92. Also, inasmuch as the error integration is not complete until the termination of the test pulse burst 85, the output of the sample gate generator 73 is supplied through line 103 to matrix 99 so that the matrix delivers the error signal to the servo-integrators only upon the occurrences of sample gate pulses. In FIG. 5, sample gate pulse 76' will deliver the error signal corresponding to pulse burst 85 to one or the other of the servo-integrators, as the case may be. The following discharge pulse 79' will then discharge the error integrator.

The output of the width servo-integrator 101 is supplied through line 104 to the retrace generator 56 to control the duration of the retrace gate. The output of slope servo-integrator 102 is supplied through line 105 to sweep generator 57, to control the sweep slope. Suitable means for controlling gate lengths are well known in the art. The particular means for controlling sweep slope will depend upon the details of the slope generator, as will be clear to those in the art. For example, if the sweep is generated by charging a capacitor from a constant current generator, the resistance of the constant current generator may be altered to change the value of the charging current. Or, the applied voltage for producing the charging current may be changed, etc.

At the conclusion of one calibration cycle, it is desired to prevent another calibration from occurring until after the next beam passage. Since the calibration pulses enter skirt detector 67, the calibration cycle will be regenerated unless suitable preventive measures are taken.

In the embodiment of FIG. 4, this is accomplished by means of the calibration inhibit generator 106. The output of the discharge gate generator 78 which initiates the autocalibration gate pulse is also supplied to generator 106 to develop an inhibit signal as shown in FIG. 5(h). During the duration of pulse 107, calibration is allowed to proceed. However, levels 108 and 108' are inhibiting levels. The output of inhibit generator 106 is supplied through line 109 to autocalibration gate generator 83 to prevent the reinitiation of gate pulse 84 during the occurrence of pulse 107. The duration of 107 overlaps the occurrence of discharge gate pulse 79' to prevent any subsequent test pulse series from being applied to the decoder until after the next beam passage.

The calibration inhibit signal is a convenient source of a control wave for the calibration sequence control unit 92. At the trailing edge 107' of FIG. 5(h) the calibration cycle will have been completed, and switching for the alternate test pulse series and calibration signal can take place. Accordingly, the output of the calibration inhibit generator 106 is supplied through line 90 to control the actuation of 92.

The sequence control wave is illustrated in FIG. 5(i). Level 93 corresponds to one state of control unit 92, and level 93' to the other state. Switching from one state to the other takes place at the trailing edge 107' of the inhibit signal waveform. The break in line 93' indicates that that state persists until the next occurrence of trailing edge 107'.

The calibration inhibit signal is also employed to perform additional functions. During the calibration cycle the calibration error signal should not enter the angle memory 60. Accordingly the output of generator 106 is supplied through line 109 to the memory input control 65 to inhibit the latter during the portion 107 of the inhibit signal. On the other hand, during the decoding of a received beam it is not desired to allow the angle error signal in line 98 to reach the servointegrators 101, 102. Accordingly, the calibration inhibit signal is supplied from generator 106 through line 109' to the calibration control matrix 99, to inhibit signals passing through matrix 99 except during the occurrence of portion 107 of the inhibit waveform.

In the embodiment described, short bursts of pulses are used for calibration. This has the advantage that the decoder circuits operate under conditions approximating those during normal beam decoding. However, if desired, continuous calibration during the intervals between successive beam passages may be employed, as described in the aforesaid application Serial No. 27,406.

The invention has been described in connection with a specific embodiment thereof used in an airborne receiver for landing purposes. It will be understood that the invention is capable of use in decoding receivers for other purposes. Also, many modifications may be made in the circuitry described as meets the requirements of the particular application.

We claim:

1. In a receiver for receiving a scanning beam coded by pulse modulations transmitted at intervals varying with the beam direction angle, the receiver including a decoder having a sweep generator and means for utilizing the time variation in the sweep amplitude to produce a signal representing the beam direction angle, an autocalibration circuit which comprises means for producing a first series of test pulses having a first repetition interval representing a first beam direction angle modulation, means for producing a second series of test pulses having a second repetition interval representing a second beam direction angle modulation, means for alternatively supplying said first and second test pulses series to said decoder during intervals between receptions of the scanning beam by the receiver, means for producing a first calibration signal corresponding to said first test pulse series, means for producing a second calibration signal corresponding to said second test pulse series, means for supplying said first calibration signal to said decoder while said first test pulse series is supplied thereto to produce a first error signal, means for supplying said second calibration signal to said decoder while said second test pulse series is supplied thereto to produce a second error signal, means for utilizing said first error signal to control the level of the sweeps of the sweep generator, and means for utilizing said second error signal to control the slope of the sweeps.

2. Apparatus in accordance with claim 1 including means for integrating the error signals resulting from successive applications to the decoder of each test pulse series, and utilizing the integrated signals for said control of the level and slope of the sweeps respectively.

3. In a receiver for receiving a scanning beam coded by pulse modulations transmitted at intervals varying with the beam direction angle, the receiver including an angle decoder having a sweep generator, means for utilizing the pulse modulations to control the duration of the sweeps of said generator, storage means for storing a signal corresponding to the direction angle of the received beam, and means for utilizing the stored signal and variations in the terminal sweep values with respect to a reference level to produce an error signal for correcting the stored signal, an autocalibration circuit which comprises means for producing a first series of test pulses having a first repetition interval representing a first beam direction angle modulation, means for producing a second series of test pulses having a second repetition interval representing a second beam direction angle modulation, means for alternatively supplying said first and second test pulse series to said decoder during intervals between receptions of the scanning beam by the receiver, means for producing a first calibration signal corresponding to said first test pulse series, means for producing a second calibration signal corresponding to said second test pulse series, means for supplying said first calibration signal to said decoder while said first test pulse series is supplied thereto to produce a first error signal, means for supplying said second calibration signal to said decoder while said second test pulse series is supplied thereto to produce a second error signal, means for said first error signal to correct the level of the sweeps of the sweep generator with respect to said reference level, and means for utilizing said second error signal to correct the slope of the sweeps.

4. Apparatus in accordance with claim 3 in which the calibration error signal which corrects the sweep level changes the initiation of the sweeps.

5. Apparatus in accordance with claim 3 in which the plurality of test pulse series are successively applied to the decoder in lieu of beam direction angle coding pulses and the respective calibration signals are applied to the decoder in lieu of the stored angle signal, whereby the calibration error signals are produced in lieu of beam direction angle error signals.

6. Apparatus in accordance with claim 5 including means for integrating the calibration error signals resulting from successive applications to the decoder of each test pulse series, and utilizing the integrated calibration error signals for correcting the level and slope of the sweeps respectively.

7. In a receiver for intermittently receiving a beam coded by pulse modulations transmitted at intervals varying in accordance with information being encoded, the receiver including a decoder having a sweep generator, means for utilizing the pulse modulations to control the duration of the sweeps of said generator, storage means for storing a signal corresponding to the encoded information of the received beam, and means for utilizing the stored signal and variations in the terminal sweep values with respect to a reference level to produce an error signal for correcting the stored signal, an autocalibration circuit which comprises means for producing a first series of test pulses having a first repetition interval representing a first beam coding pulse modulation, means for producing a second series of test pulses having a second repetition interval representing a second beam coding pulse modulation, means for alternatively applying said first and second test pulse series to said decoder during intervals between receptions of the beam by the receiver, means for producing a first calibration signal corresponding to said first test pulse series, means for producing a second calibration signal corresponding to said second test pulse series, means for supplying said first calibration signal to said decoder while said first test pulse series is supplied thereto to produce a first error signal, means for supplying said second calibration signal to said decoder while said second test pulse series is supplied thereto to produce a second error signal, means for utilizing said first error signal to correct the level of the sweeps of the sweep generator with respect to said reference level, and means for utilizing said second error signal to correct the slope of the sweeps.

8. An automatic calibration system for a pulse interval decoder in which a sweep generator initiates a sawtooth wave after the occurrence of each input pulse and terminates said wave in response to the occurrence of the next following input pulse, the decoder providing an output that depends on the peak amplitude of said sawtooth wave and represents the interval between input pulses, comprising:
  (a) means for producing a first series of test pulses having a first repetition interval and a second series of test pulses having a second repetition interval different from said first repetition interval,
  (b) means for producing a first calibration reference signal equivalent to the decoder output correctly representing said first repetition interval and a second calibration reference signal equivalent to the decoder output correctly representing said second repetition interval,
  (c) comparator means adapted to produce an error signal corresponding to the difference between the actual output of the decoder and a calibration reference signal applied to said comparator means,
  (d) switch means for selectively applying said first and second series of test pulses as input to the decoder, and applying said first calibration reference signal to said comparator when said first series of test pulses is applied to the decoder and applying said second calibration reference signal to said comparator when said second series of test pulses is applied to the decoder, whereby said comparator produces respective first and second error signals,
  (e) sweep level control means responsive to the first of said error signals to adjust the level of the sawtooth wave produced by said sweep generator to decrease said first error signal, and
  (f) sweep slope control means responsive to the second of said error signals to adjust the slope of said sawtooth wave to decrease said second error signal.

References Cited by the Examiner
UNITED STATES PATENTS 2,861,177  11/58  Dishal et al. _____ 343—102

CHESTER L. JUSTUS, *Primary Examiner.*